United States Patent
Morimoto et al.

(10) Patent No.: US 9,891,042 B2
(45) Date of Patent: Feb. 13, 2018

(54) MEASUREMENT METHOD, MEASUREMENT APPARATUS, MEASUREMENT PROGRAM AND COMPUTER READABLE RECORDING MEDIUM IN WHICH MEASUREMENT PROGRAM HAS BEEN RECORDED

(71) Applicant: 4D SENSOR INC., Wakayama (JP)

(72) Inventors: Yoshiharu Morimoto, Wakayama (JP); Akihiro Masaya, Wakayama (JP); Akifumi Takagi, Wakayama (JP)

(73) Assignee: 4D SENSOR INC., Wakayama (JP)

( * ) Notice: Subject to any disclaimer, the term of this patent is extended or adjusted under 35 U.S.C. 154(b) by 0 days.

(21) Appl. No.: 14/907,009

(22) PCT Filed: Jun. 30, 2014

(86) PCT No.: PCT/JP2014/067420
§ 371 (c)(1),
(2) Date: Jan. 22, 2016

(87) PCT Pub. No.: WO2016/001986
PCT Pub. Date: Jan. 7, 2016

(65) Prior Publication Data
US 2017/0102228 A1    Apr. 13, 2017

(51) Int. Cl.
*G06K 9/00*    (2006.01)
*G01B 11/16*    (2006.01)
*G06T 7/246*    (2017.01)

(52) U.S. Cl.
CPC .............. *G01B 11/16* (2013.01); *G06T 7/246* (2017.01)

(58) Field of Classification Search
CPC .............................. G01B 11/16; G06T 7/246
See application file for complete search history.

(56) References Cited

U.S. PATENT DOCUMENTS

| | | | |
|---|---|---|---|
| 2002/0135751 A1 | 9/2002 | Steinbichler et al. | |
| 2015/0049331 A1* | 2/2015 | Ri | G01B 11/2513 356/73 |
| 2016/0161249 A1* | 6/2016 | Ri | G01M 5/0091 702/42 |

FOREIGN PATENT DOCUMENTS

| | | |
|---|---|---|
| JP | 2002-303512 | 10/2002 |
| JP | 2009-264852 | 11/2009 |
| JP | 2011-174874 | 9/2011 |

OTHER PUBLICATIONS

Yasuhiko Arai et al., "High Speed- and High Resolutive-Moiré Topography by the Method of Fringe Scanning Interferometry", Kogaku, vol. 15, No. 5, pp. 402-406, 1986.

(Continued)

*Primary Examiner* — Tom Y Lu
(74) *Attorney, Agent, or Firm* — Staas & Halsey LLP

(57) ABSTRACT

A phase of a specific frequency is found by carrying out a two-dimensional Fourier transformation on an image of a two-dimensional grid image on the surface of an object taken by a camera, and the displacement of the surface of the object is measured from the phase. As a result, measurement that is strong against noise can be carried out without projecting a grid having a brightness distribution of precise cosine waves. In addition, the process is simple and the number of pixels used for the measurement is smaller than that in the sampling moire method. The displacement can be found at a high speed.

8 Claims, 2 Drawing Sheets

(56) References Cited

OTHER PUBLICATIONS

Yoshiharu Morimoto et al., "Recent Studies on Shape and Deformation Measurements by Moiré Method and Grid Method", Journal of JSNDI, vol. 52, No. 3, 2003, pp. 116-121.

Ri, S. et al., "Non-Contact Measurement of the Displacement Distribution of a Structure in Accordance with a Sampling Moiré Method," Inspection Technologies, Japan Industrial Publishing Co., Ltd., vol. 14, No. 5, 2009, pp. 1-6.

Mitsuo Takeda et al., "Fourier Transform Profilometry for the Automatic Measurement of 3-D Object Shapes," Applied Optics, vol. 22, No. 24, Dec. 15, 1983, pp. 3977-3982.

Y. Morimoto et al., "Two-Dimensional Moiré Method and Grid Method Using Fourier Transform," Experimental Mechanics, vol. 29, No. 4, pp. 399-404, Dec. 1989.

Motoharu Fujigaki et al, "Shape Measurement with Grating Projection Using Whole-Space Tabulation Method", vol. 8, No. 4, pp. 92-98, Dec. 2008.

International Search Report dated Sep. 2, 2014, in corresponding International Application No. PCT/JP2014/067420.

Extended European Search Report dated Feb. 3, 2017 in corresponding European Patent Application No. 14896934.8.

Yves Surrel et al., "Simultaneous u-v displacement field measurement with a phase-shifting grid method", Interferometry '94: Photomechanics, vol. 2342, SPIE, Nov. 30, 1994, pp. 66-75.

Maria Pirga et al., "Two directional spatial-carrier phase-shifting method for analysis of crossed and closed fringe patterns", Optical Engineering, vol. 34, No. 8, SPIE, Aug. 1, 1995, pp. 2459-2466, retrieved from URL: http://opticalengineering.spiedigitallibrary.org/article.aspx?articleid=1073851 on Jan. 24, 2017.

Yves Surrel, "Fringe Analysis", Photomechanics, Topics in Applied Physics, vol. 77, Springer Berlin Heidelberg, Feb. 9, 2000, pp. 55-102.

* cited by examiner

MEASUREMENT METHOD, MEASUREMENT APPARATUS, MEASUREMENT PROGRAM AND COMPUTER READABLE RECORDING MEDIUM IN WHICH MEASUREMENT PROGRAM HAS BEEN RECORDED

CROSS-REFERENCE TO RELATED APPLICATIONS

This application is a U.S. National Stage Application which claims the benefit under 35 U.S.C. 371 of PCT International Application PCT/JP2014/067420, filed Jun. 30, 2014, the contents of which are incorporated herein by reference.

TECHNICAL FIELD

The present invention relates to a measurement method and the like according to which a phase distribution, a displacement distribution and a strain distribution can be analyzed from an image, and an analysis of a moving image is also possible.

BACKGROUND ART

In recent years, optimal designing has been carried out on a material, and it has become important to check the displacement applied to the material or the strain distribution. Methods used to check the displacement and the strain distribution of the material include a method for preparing distribution data by using a large number of displacement meters or strain gauges for a single-point measurement method, and a digital image correlation method for pattern matching by checking the correlation between the images before and after deformation.

PRIOR ART DOCUMENTS

Non-Patent Document 1: Yasuhiko Arai and Tadao Kurata, High Speed- and High Resolutive-Moire Topography by the Method of fringe Scanning Interferometry, Kogaku (in Japanese), Vol. 15, No. 5, pp. 402-406 (1986)
Non-Patent Document 2: Yoshiharu Morimoto, Motoharu Fujigaki and Satoru Yoneyama, Recent Studies on Shape and Deformation Measurements by Moire Method and Grid Method, Journal of JSNDI (in Japanese), 52-3 (2003), pp. 116-121
Non-Patent Document 3: Ri, S., Morimoto, Y. and Fujigaki, M., "Non-Contact Measurement of the Displacement Distribution of a Structure in Accordance with a Sampling Moire Method," Inspection Technology, Japan Industrial Publishing Co., Ltd., 14 (5), (2009), pp. 1-6
Non-Patent Document 4: Takeda, M. and Mutoh, K., "Fourier Transform Profilometry for the Automatic Measurement of 3-D Object Shapes," Applied Optics, 22-24, pp. 3977-3982 (1983)
Non-Patent Document 5: Morimoto, Y, Seguchi, Y. and Higashi, T., "Two-Dimensional Moire Method and Grid Method Using Fourier Transform," Experimental Mechanics, Vol. 29, No. 4, pp. 399-404 (1989)
Non-Patent Document 6: Motoharu Fujigaki and Yoshiharu Morimoto, Shape Measurement with Projection Using Whole-space Tabulation Method, Vol. 8, No. 4, pp. 92-98 (2008)

SUMMARY OF THE INVENTION

1. Problem to Be Solved by the Invention

As for the method for preparing distribution data using a displacement meter or a strain gauge, though it is inexpensive to carry out single-point measurement, it takes money and time to measure a large number of points, which also makes the following data processing complicated. Though the digital image correlation method has been widely used recently, it requires a random pattern, and an area of a certain degree is necessary in order to gain correlation, which generally makes the gauge length long.

A grid method allows for an analysis of a phase in a grid so that the deformation thereof can be analyzed with high precision, and thus allows in-plane deformation and a three-dimensional form to be measured with high precision. Phase analysis methods used for the conventional grid method include a phase shift method and a Fourier transform method (Non-Patent Documents 4 and 5). A sampling moire method, which is one phase shift method (Non-Patent Document 3), and a Fourier transform method allow a phase to be analyzed from one image, and therefore are useful for the analysis of a moving object and the like. In accordance with a sampling moire method, phases are calculated using data for two periods, and in accordance with a Fourier transform method, phases are analyzed using data for all the pixels. Furthermore, in accordance with the sampling moire method that has been recently developed by the inventors, phases are analyzed with high precision. However, data for two periods in a grid is required to find the displacement of one point, and the brightness is found by using linear interpolation, and therefore, high precision cannot be obtained.

2. Means for Solving Problem

According to the main characteristics of the present invention, a two-dimensional grid in the x direction and the y direction is used, and a grid image of an area having one period respectively in the x and y directions is cut out and then two-dimensionally Fourier transformed so as to find a phase of a component with a frequency 1, and thus, displacements of the grid in the x direction and the grid in the y direction are found with high precision.

3. Effects of the Invention (1) Precision is high because of the measurement using phase analysis.
(2) Phase analysis can be carried out with one image, and therefore, form measurement of a moving object is possible.
(3) Only the frequencies of a two-dimensional grid image in the x direction and the y direction are sampled in accordance with two-dimensional Fourier transformation, and therefore, it is not necessary to use a two-dimensional grid having a brightness distribution of precise cosine waves.
(4) In addition, only the frequencies of a two-dimensional grid image in the x direction and the y direction are sampled in accordance with two-dimensional Fourier transformation, and therefore, the noise that appears in high-frequency portions is automatically deleted, and thus, the system is strong against noise.
(5) The process is simple and can be carried out at a high speed.
(6) The gauge length is Nx×Ny pixels, which is shorter than that in the sampling moire method. In general, the gauge length is shorter than that in the digital image correlation method.

(7) In accordance with the sampling moire method, moire fringes are generated from linear interpolation, while in accordance with the present invention, correlation is taken with cosine waves, which makes precision higher.

PREFERRED EMBODIMENTS OF THE INVENTION

The measurement method for measuring a displacement of a surface of an object from a two-dimensional grid image on the surface of the object taken by a camera according to one embodiment of the present invention includes the steps of taking an image of a two-dimensional grid image on a surface of an object with a camera in such a state that the direction of camera pixels is adjusted towards the image of the two-dimensional grid image before displacement, and at the same time one period of the image of the two-dimensional grid image in the x direction is adjusted to Nx pixels of the camera and one period in the y direction is adjusted to Ny pixels of the camera, where Nx and Ny are integers greater than 2; obtaining a phase from the above-described image of the two-dimensional grid image for the frequencies in the x direction and the y direction that correspond to one period of the above-described grid in the above-described image of the two-dimensional grid image; and finding a displacement of the surface of the object from the phase.

Furthermore, the measurement method according to another embodiment of the invention further includes the steps of smoothing the above-described image of the two-dimensional grid image in the x direction by Nx pixels or smoothing the above-described image of the two-dimensional grid image in the y direction by Ny pixels so that any one of the grid lines in the x direction or the y direction disappears. Alternatively, the invention includes a measurement apparatus with which these measurement methods can be implemented.

The measurement program for measuring a displacement on a surface of an object from an image of a two-dimensional grid image on the surface of the object taken by a camera according to still another embodiment of the invention allows a computer to run the steps of inputting an image of a two-dimensional grid image before displacement; obtaining a phase from the image data of Nx×Ny pixels that correspond to one period of the grid in the x direction and the y direction in the above-described image of the two-dimensional grid image for the frequencies in the x direction and the y direction that correspond to one period of the above-described grid in the above-described image of the two-dimensional grid image; and finding a displacement on the surface of the object from the phase.

Moreover, the invention includes a computer readable recording medium in which the above-described measurement program has been recorded.

By providing the above-described configurations, an image of a two-dimensional grid on the surface of an object can be taken by a camera so that a displacement of the surface of the object in the lateral direction can be measured. In addition, strain can be measured from the displacement in the lateral direction.

Figure 1:
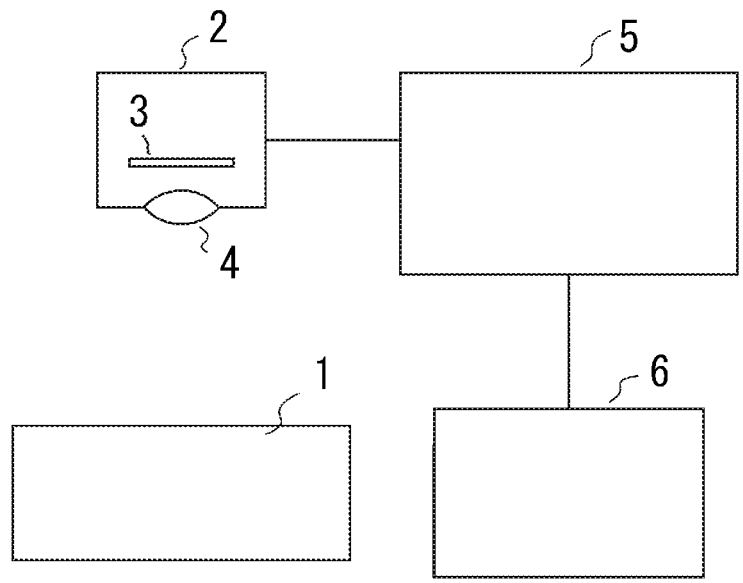
FIG. 1 shows the configuration of the entirety of the apparatus according to the first embodiment.

FIG. 1 shows the configuration of the entirety of the apparatus according to the first embodiment. 1 is an object to be measured, 2 is a camera, 3 is an imaging surface, 4 is a lens, 5 is a computer, and 6 is a display unit such as a liquid crystal display unit. The upper surface of the object to be measured 1 has a two-dimensional grid. The two-dimensional grid may be printed or pasted or may be the structure itself.

Figure 2:
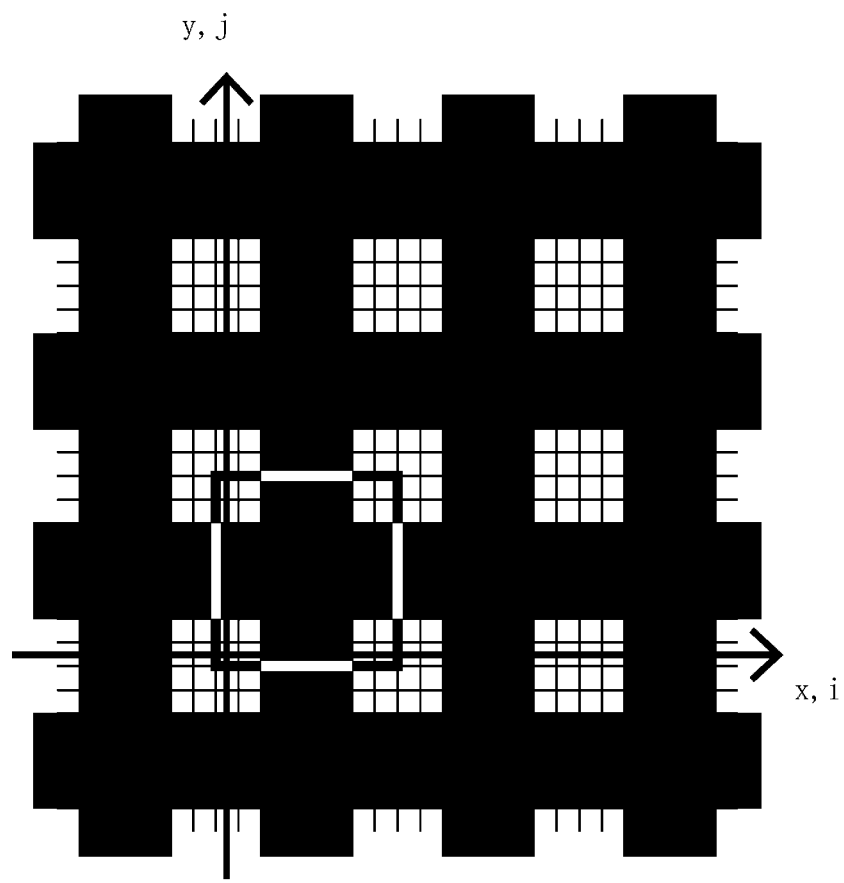
FIG. 2 shows a two-dimensional grid on the surface of an object to be measured or a two-dimensional grid image reflected onto the camera imaging surface.

FIG. 2 shows the two-dimensional grid on the upper surface of the object to be measured 1 or a two-dimensional grid image reflected on the imaging surface 3. The respective axes of the grid lines in the two-dimensional grid on the upper surface of the object to be measured 1 are in the x direction and the y direction.

An image of this two-dimensional grid on the object to be measured 1 is taken by a camera. FIG. 2 shows the two-dimensional grid projected onto the imaging surface 3 that has pixels in coordinates in the i direction and the j direction that are indicated by fine lines. When an image is taken, the i direction and the j direction are adjusted to the x direction and the y direction, respectively. In addition, the magnification is adjusted so that one period of the grid consists of N pixels of the camera. Here, the period of the grid in the x direction is Nx and the period of the grid in the y direction is Ny, where Nx and Ny are both integers. FIG. 2 shows an embodiment where Nx and Ny are both 8. This adjustment can be easily carried out. An image of the two-dimensional grid may be taken, and an adjustment may be carried out so that the moire fringes, which are generated when an image gained by thinning Nx pixels and Ny pixels respectively is displayed, disappear. As described below, measurement is possible under the assumption of an error due to the aberration of the lens. Though the precision is high when the grid is precisely adjusted to match the pixels, the precision is not so bad even when the adjustment is not very strict.

Thus, the optical system is very simple. When the directions and the magnification are adjusted as described above, the two-dimensional grid on the surface of the object to be measured and the image of the two-dimensional grid reflected onto the camera imaging surface correspond to each other as in FIG. 2. Here, the frequencies in the x direction and the y direction are collectively denoted as frequencies (fx, fy), where fx and fy are frequencies in the x direction and the y direction, respectively.

Figure 3A:
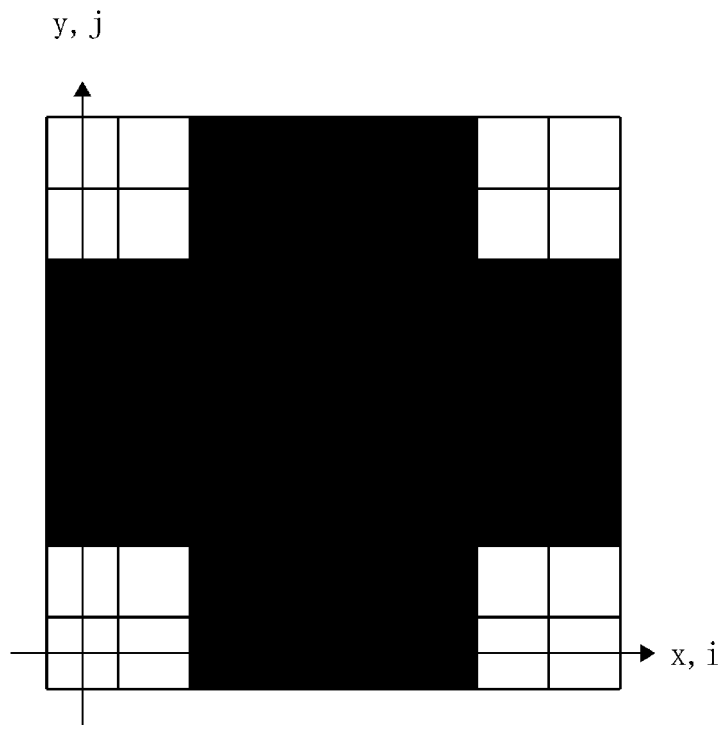
FIG. 3A shows a procedure for processing the two-dimensional grid.
Figure 3B:
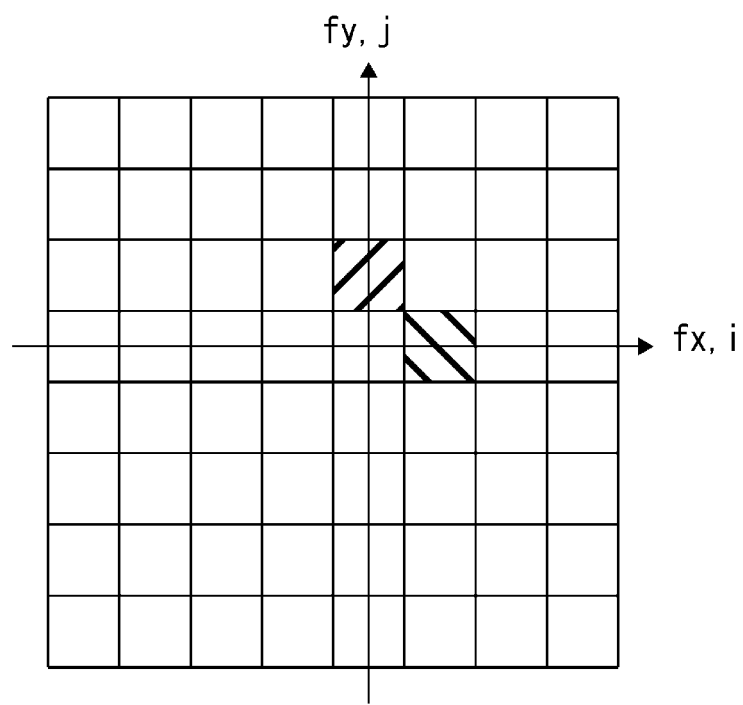
FIG. 3B shows a procedure for processing the two-dimensional grid.

FIGS. 3A and 3B show a procedure for processing the two-dimensional grid. FIG. 3A is a diagram showing a cut-out of 8×8 pixels within a box of medium-thick lines in FIG. 2, and FIG. 3B is a diagram showing the sampling of frequencies (1, 0) and (0, 1) in the Fourier transform plane.

The procedure for processing in this embodiment is as follows. The deformation in this procedure is generated when a load is applied; however, the deformation may be caused by another means.

(1) An image of the two-dimensional grid on the surface of an object to be measured is taken by a camera before deformation.

(2) A pixel region of Nx×Ny which corresponds to one period in the x direction and the y direction is cut out from the two-dimensional grid image reflected on the camera imaging surface in FIG. 2, and a two-dimensional Fourier transformation is carried out. FIG. 3A shows a cut-out of the pixel region in a box of medium-thick lines, which corresponds to the pixel region of Nx×Ny in FIG. 2.

(3) As shown in FIG. 3, the components of the frequencies (1, 0) and the frequencies (0, 1) are sampled in the Fourier transform plane. Here, the components of the frequencies (−1, 0) or the components of the frequencies (0, −1) may be used.

(4) The phases of the two sampled frequencies are found. The phase found for the frequencies (1, 0) is in the x direction, and the phase found for the frequencies (0, 1) is in the y direction. The results are related to the pixel at the coordinate (0, 0) so as to store the data as the phase in the x direction and the phase in the y direction. Two pieces of data are related to each other when stored in a pixel.

(5) The above-described processes (3) and (4) are carried out for all the pixels. That is to say, the cut-out pixel region Nx×Ny is shifted while the processes (3) and (4) are being carried out, and thus, two pieces of data are related to each other while being stored in every pixel as described above.

(6) Phase unwrapping (phase connection) is carried out on the thus-gained phase distributions in the x direction and the y direction, respectively. In the case of a grid projection method, the phases of the grid basically become a monotonous function. Therefore, phase unwrapping (phase connection) can be easily carried out by increasing or decreasing by 2π whenever a phase jumps. As a result, the x direction phase distribution and the y direction phase distribution can be gained on the entire surface.

(7) The phases are multiplied by p/(2π) in the x direction and multiplied by q/(2π) in the y direction so as to be converted to location distributions. Here, p and q are periods of the grid in the x direction and the y direction, respectively.

(8) The above-described processes (1) through (7) are carried out on the surface of the object to be measured after deformation as well so as to gain the grid location distribution. Thus, the displacement distribution of the surface of the object to be measured is found from the difference in the grid location distribution before and after deformation.

(9) As described above, the displacement of the surface of the object to be measured is found from the difference in the grid location distribution. Alternatively, the displacement distribution of the surface of the object to be measured may be found by finding the differences in the x direction phase distribution and the y direction phase distribution on the entire surface before and after deformation, and then by multiplying the phases by p/(2π) in the x direction and by q/(2π) in the y direction.

In addition, the strain can be found by differentiating the x direction phase distribution and the y direction phase distribution on the entire surface.

Here, in the above-described phase calculation, Fourier transformation and the calculation of the phase for the components of the frequencies (1, 0) and (0, 1) do not need to be carried out. Instead, the phase θ can be found for the components of the frequencies (1, 0) and (0, 1) from the following formula.

$$\frac{\sum_{k=0}^{N-1} I_k \sin\left(k \frac{2\pi}{N}\right)}{\sum_{k=0}^{N-1} I_k \cos\left(k \frac{2\pi}{N}\right)} = -\tan\theta$$

[Formula 1]

Here, $I_k$ is the intensity of light in the $k^{th}$ pixel in the x direction or the y direction and has a signal value gained from this pixel.

The phase θ can be found for all the pixels in the x direction from the above formula, and phase connection is carried out in the x direction so that the x direction phase Θx of the two-dimensional grid can be gained. The y direction phase Θy can be gained for the phases in the y direction in the same manner.

In this embodiment, it is ideal for the (i, j) pixel to be precisely in the location of the phase (0, 0) and for the periods of the image of the two-dimensional grid image to be precisely adjusted so as to consist of Nx pixels and Ny pixels. In reality, however, the phase changes due to the aberration of the lens or an error in the setting. As a result, the measurement results have a small displacement, which is not 0, from the ideal value. This displacement is referred to as initial displacement.

In the case where there is such an initial displacement, the following is applied.

The above-described processes (1) through (7) are carried out on the image of the two-dimensional grid image on the surface of the object to be measured, and thus, the x direction location distribution and the y direction initial location distribution on the entire surface can be gained.

Next, a load is applied and the two-dimensional grid image deforms. Together with this, the image of the two-dimensional grid image deforms. The phase distribution and the displacement distribution at this time are found through the above-described processes (1) through (7). The thus-gained phase distribution is regarded as the phase distribution after deformation.

The initial phase distribution is subtracted from this phase distribution after deformation, and the result is referred to as phase distribution due to deformation. This phase distribution can be multiplied by the period of the two-dimensional grid and divided by 2π so as to find the displacement. This displacement can be differentiated so as to find the strain.

Thus, not only the displacement on the entire surface, but also the x direction strain distribution, the y direction strain distribution and the sharing strain distribution can be gained even when there is initial displacement, and therefore, maximum strain distribution, minimum strain distribution and principal direction distribution can be gained.

For the above-described setting where the displacement is 0 before deformation, phase distribution of the image of the two-dimensional grid image is displayed while taking an image of the grid with a camera, and the location where the phase becomes 0 may be found by adjusting the position of the camera, and therefore, the optical system can be easily adjusted to the precise position. Even if there is a small distortion in reality, such a distortion is almost cancelled because the phase difference and the displacement difference are calculated.

The frequencies (1, 0) and the frequencies (0, 1) are usually the frequencies with the period Nx and the period Ny, respectively, and therefore, the phases with the period Nx and the period Ny may be used without obtaining the frequencies (1, 0) and the frequencies (0, 1) from the power spectrum. That is to say, in order to find the phase in the x direction, smoothing may be carried out on the Ny pixels in the y direction so as to erase the grid lines perpendicular to the y direction, and thus, a one-dimensional grid perpendicular to the x direction may be gained, and the phase in the x direction may be calculated in Formula 1. In order to find the phase in the y direction, smoothing may be carried out on the Nx pixels in the x direction so as to erase the grid lines perpendicular to the x direction, and thus, a one-dimensional grid perpendicular to the y direction may be gained, and the phase in the y direction may be calculated in Formula 1. As a result, a phase can be found without Fourier transformation.

In this embodiment, the phases of the frequencies (1, 0) and the frequencies (0, 1) are gained after Fourier transformation, and therefore, measurement that is strong against noise can be carried out without drawing or projecting a grid having brightness distribution of precise cosine waves.

EXPLANATION OF SYMBOLS 1 object to be measured
2 digital camera
3 image sensor
4 lens
5 computer
6 display unit

The invention claimed is:

1. A method for measuring a deformation of a surface of an object on which a two-dimensional grid is provided on the basis of a two-dimensional grid image of the surface of the object taken by a camera, comprising:
    taking the two-dimensional grid on the surface of the object with the camera to obtain the two-dimensional grid image in such a state that the directions of camera pixels are adjusted to the two-dimensional grid image of the surface of the object, and at the same time one period of said two-dimensional grid image in an x direction is adjusted to Nx pixels of the camera and one period in a y direction is adjusted to Ny pixels of the camera, where Nx and Ny are integers greater than 2 and smaller than the number of pixels in the x and y directions on an imaging surface of the camera;
    cutting out a pixel region of Nx×Ny which corresponds in the x direction and the y direction from the two-dimensional grid image;
    carrying out a two dimensional Fourier transformation to the cut out pixel region, and sampling a set of components (1, 0) and (0, 1) or (−1, 0) and (0, −1) of the frequencies in the Fourier transform plane;
    finding the phases of either set of the frequencies in each pixel of the two-dimensional grid image for the frequencies in the x direction and the y direction that correspond to one period of said grid in said image of the two-dimensional grid image; and
    after the surface of the object is deformed, the finding the phases on the two-dimensional grid image taken by the camera, is carried out on each pixel of the image to obtain the deformation of the object on the basis of the phases of each pixel before and after the deformation of the surface of the object.

2. A method for measuring a deformation of a surface of an object on which a two-dimensional grid is provided on the basis of a two-dimensional grid image of the surface of the object taken by a camera, comprising:
    taking the two-dimensional grid on the surface of the object with the camera to obtain the two-dimensional grid image in such a state that the directions of camera pixels are adjusted to the two-dimensional grid image of the surface of the object, and at the same time one period of said two-dimensional grid image in an x direction is adjusted to Nx pixels of the camera and one period in a y direction is adjusted to Ny pixels of the camera, where Nx and Ny are integers greater than 2 and smaller than the number of pixels in the x and y directions on an imaging surface of the camera;
    cutting out a pixel region of Nx×Ny which corresponds in the x direction and the y direction, from the two-dimensional grid image;
    sampling data on intensity of the Nx pixels in the x direction or that of the Ny pixels in the Y direction from the cut out pixel region, and obtaining phase θ of the component of the frequency, the period of which is N pixels through the following formula:

$$\frac{\sum_{k=0}^{N-1} I_k \sin\left(k\frac{2\pi}{N}\right)}{\sum_{k=0}^{N-1} I_k \cos\left(k\frac{2\pi}{N}\right)} = -\tan\theta$$

wherein Ik is the intensity of light in the kth pixel in the x or y direction of the value gained from the pixel; and
    after the surface of the object is deformed, taking the two-dimensional grid image by the camera, the obtaining the phase θ being carried out on each pixel of the two-dimensional grid image, and identifying the deformation of the surface of the object on the basis of said phase θ.

3. A measurement apparatus comprising a camera and a computer with which the measurement method according to claim 1 is implemented.

4. A program stored on non-transitory computer-readable medium for measuring a deformation of a surface of an object on which a two-dimensional grid is provided on the basis of a two-dimensional grid image of the surface of the object taken by a camera and allowing a computer to perform:
    taking the two-dimensional grid on the surface of the object with a camera to obtain the two-dimensional grid image in such a state that the directions of camera pixels are adjusted to the two-dimensional grid image of the surface of the object, and at the same time one period of said two-dimensional grid image in;
    an x direction is adjusted to Nx pixels of the camera and one period in a y direction is adjusted to Ny pixels of the camera, where Nx and Ny are integers greater than 2 and smaller than the number of pixels in the x and y directions on an imaging surface of the camera; and
    cutting out a pixel region of Nx×Ny which corresponds in the x direction and the y direction from the two-dimensional grid image;
    carrying out the two dimensional Fourier transformation to the cut out pixel region, and sampling a set of components (1, 0) and (0, 1) or (−1, 0) and (0, −1) of the frequencies in the Fourier transform plane;
    finding the phases of either set of the frequencies in each pixel of the two-dimensional grid image; and
    after the surface of the object is deformed, the finding the phases on the two-dimensional grid image taken by the camera is carried out on each pixel of the image to obtain the deformation of the object on the basis of the phases of each pixel before and after the deformation of the surface of the object.

5. A non-transitory computer readable recording medium in which the program according to claim 4 has been recorded.

6. A measurement apparatus comprising a camera and a computer with which the measurement method according to claim 2 is implemented.

7. A program stored on a non-transitory computer-readable medium for measuring a deformation of a surface of an object on which a two-dimensional grid is provided on the basis of a two-dimensional grid image of the surface of the object taken by a camera and allowing a computer to perform:

taking the two-dimensional grid on the surface of the object with the camera to obtain the two-dimensional grid image in such a state that the directions of camera pixels are adjusted to the two-dimensional grid image of the surface of the object, and at the same time one period of said two-dimensional grid image in an x direction is adjusted to Nx pixels of the camera and one period in a y direction is adjusted to Ny pixels of the camera, where Nx and Ny are integers greater than 2 and smaller than the number of pixels in the x and y directions on an imaging surface of the camera;

cutting out a pixel region of Nx×Ny which corresponds to the x direction and the y direction of the two-dimensional grid image;

sampling data on intensity of the Nx pixels in the x direction or that of the Ny pixels in the y direction from the cut out pixel region, and obtaining phase θ of the component of the frequency, the period of which is N pixels through the following formula:

$$\frac{\sum_{k=0}^{N-1} I_k \sin\left(k\frac{2\pi}{N}\right)}{\sum_{k=0}^{N-1} I_k \cos\left(k\frac{2\pi}{N}\right)} = -\tan\theta$$

wherein Ik is the intensity of light in the kth pixel in the x or y direction of the value gained from the pixel; and after the surface of the object is deformed, taking the two-dimensional grid image by the camera, the obtaining the phase θ being carried out on each pixel of the two-dimensional grid image, and identifying the deformation of the surface of the object on the basis of said phase θ.

8. A non-transitory computer readable recording medium in which the measurement program according to claim 7 has been recorded.

* * * * *

UNITED STATES PATENT AND TRADEMARK OFFICE
CERTIFICATE OF CORRECTION

PATENT NO. : 9,891,042 B2
APPLICATION NO. : 14/907009
DATED : February 13, 2018
INVENTOR(S) : Yoshiharu Morimoto et al.

It is certified that error appears in the above-identified patent and that said Letters Patent is hereby corrected as shown below:

In the Claims

Column 8, Line 5:
In Claim 2, delete "Y" and insert -- y --, therefore.

Column 8, Line 46:
In Claim 4, after "camera;" delete "and".

Signed and Sealed this
Tenth Day of April, 2018

Andrei Iancu
*Director of the United States Patent and Trademark Office*